(12) United States Patent
Shinohara et al.

(10) Patent No.: US 9,876,336 B2
(45) Date of Patent: Jan. 23, 2018

(54) GAS-INSULATED SWITCHING APPARATUS

(71) Applicant: MITSUBISHI ELECTRIC CORPORATION, Chiyoda-ku, Tokyo (JP)

(72) Inventors: Nobuyuki Shinohara, Tokyo (JP); Yasuhiro Tsukao, Tokyo (JP); Masato Kawahigashi, Tokyo (JP); Masahiro Fujioka, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/504,532

(22) PCT Filed: Apr. 17, 2015

(86) PCT No.: PCT/JP2015/061912
§ 371 (c)(1),
(2) Date: Feb. 16, 2017

(87) PCT Pub. No.: WO2016/067661
PCT Pub. Date: May 6, 2016

(65) Prior Publication Data
US 2017/0250527 A1    Aug. 31, 2017

(30) Foreign Application Priority Data

Oct. 27, 2014    (JP) .................... PCT/JP2014/078534

(51) Int. Cl.
*H02B 13/035*    (2006.01)
*H01H 33/56*    (2006.01)
(Continued)

(52) U.S. Cl.
CPC .......... *H02B 13/0352* (2013.01); *H01H 9/50* (2013.01); *H01H 33/26* (2013.01); *H01H 33/56* (2013.01); *H02B 1/26* (2013.01); *H02B 13/0356* (2013.01)

(58) Field of Classification Search
CPC .......... H01H 9/50; H01H 33/26; H01H 33/56; H02B 13/0352; H02B 13/0356; H02B 13/035; H02B 1/26
(Continued)

(56) References Cited

U.S. PATENT DOCUMENTS 5,991,148 A *  11/1999  Heil ..................... H02B 5/06
                                                 361/605
7,675,738 B2 *  3/2010  Fukunaga .......... H02B 13/0352
                                                 361/612
(Continued)

FOREIGN PATENT DOCUMENTS

EP    2 270 939 A2    1/2011
JP    57-122609 A     7/1982
(Continued)

OTHER PUBLICATIONS

International Search Report (PCT/ISA/210) dated May 19, 2015, by the Japanese Patent Office as the International Searching Authority for International Application No. PCT/JP2015/061912.
(Continued)

*Primary Examiner* — Renee S Luebke
*Assistant Examiner* — William Bolton
(74) *Attorney, Agent, or Firm* — Buchanan Ingersoll & Rooney PC

(57) ABSTRACT

A gas-insulated switching apparatus of a three-phase-isolated type includes: two first main buses and extending in parallel at an identical height; a first connection bus interconnecting the first main buses; a first divergence bus
(Continued)

diverging downward from the first connection bus; and a first circuit breaker connected to the first divergence bus, wherein a connection portion between the first connection bus and the first divergence bus is disposed at a position lower than the height at which the first main buses extend, and a grounding switch is disposed above the connection portion between the first connection bus and the first divergence bus.

8 Claims, 14 Drawing Sheets

(51) Int. Cl.
　　*H01H 33/26* 　　(2006.01)
　　*H02B 1/26* 　　(2006.01)
　　*H01H 9/50* 　　(2006.01)
(58) Field of Classification Search
　　USPC .......... 218/78, 55, 67, 75, 79; 361/612, 611, 361/624, 637
　　See application file for complete search history.

(56) References Cited

U.S. PATENT DOCUMENTS

| | | | | |
|---|---|---|---|---|
| 8,000,087 | B2* | 8/2011 | Fujita | H02B 5/06 361/612 |
| 8,111,503 | B2* | 2/2012 | Takeuchi | H02B 5/06 361/618 |
| 8,254,088 | B2* | 8/2012 | Tanaka | H02B 1/22 361/604 |
| 2006/0283841 | A1 | 12/2006 | Sologuren-Sanchez et al. | |
| 2009/0261069 | A1 | 10/2009 | Kisanuki et al. | |
| 2013/0148268 | A1* | 6/2013 | Sologuren-Sanchez . | H02B 5/06 361/612 |

FOREIGN PATENT DOCUMENTS

| | | |
|---|---|---|
| JP | 61-142910 A | 6/1986 |
| JP | 1-186106 A | 7/1989 |
| JP | 3-040702 A | 2/1991 |
| JP | 4-308405 A | 10/1992 |
| JP | 6-197420 A | 7/1994 |
| JP | 11-252720 A | 9/1999 |
| JP | 2007-014079 A | 1/2007 |
| JP | 2007-524337 A | 8/2007 |
| JP | 2008-245376 A | 10/2008 |
| JP | 2010-016934 A | 1/2010 |
| JP | 2011-015490 A | 1/2011 |
| WO | WO 2008/068944 A1 | 6/2008 |

OTHER PUBLICATIONS

Written Opinion (PCT/ISA/237) dated May 19, 2015, by the Japanese Patent Office as the International Searching Authority for International Application No. PCT/JP2015/061912.

* cited by examiner

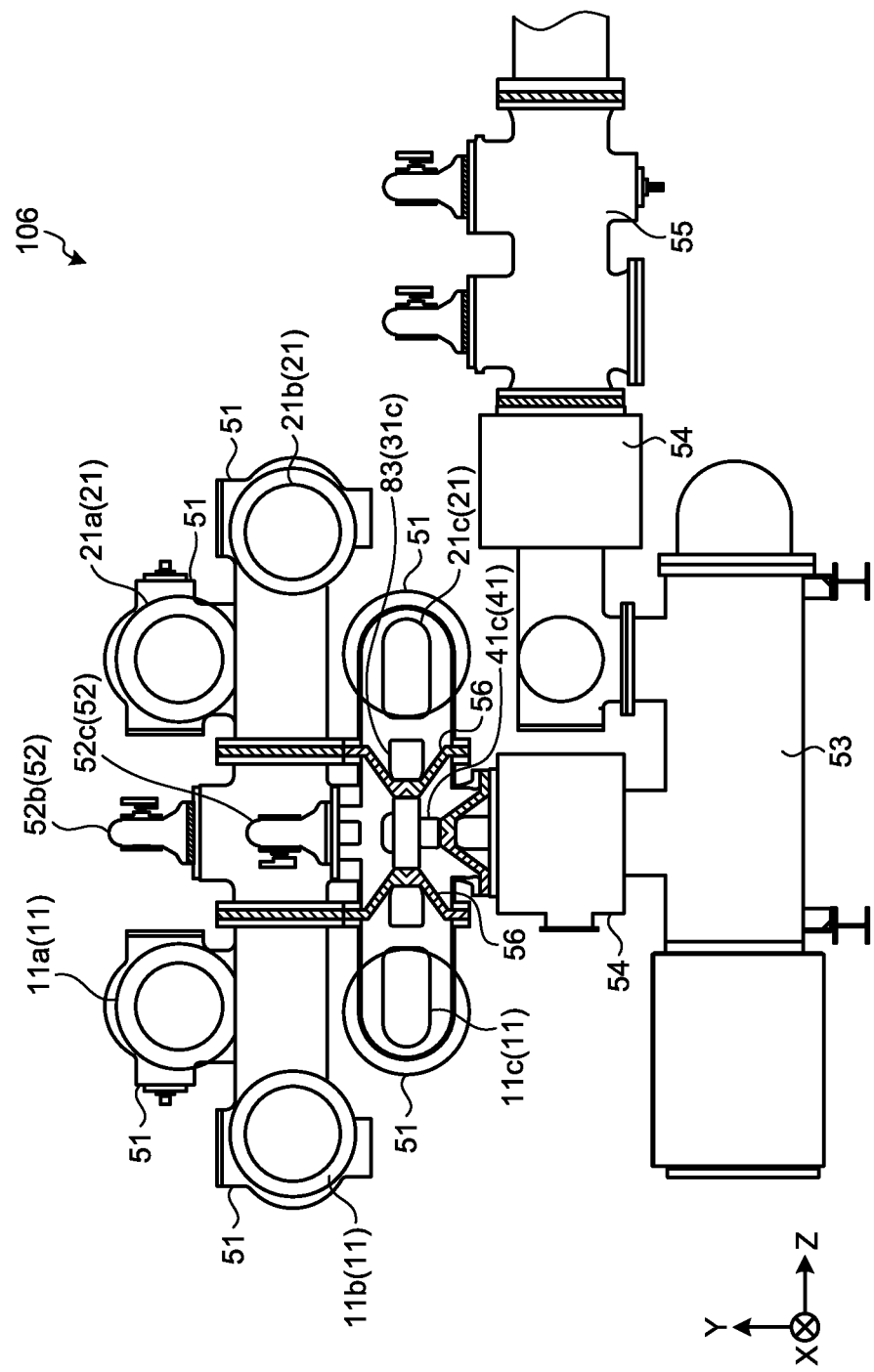

GAS-INSULATED SWITCHING APPARATUS

FIELD

The present invention relates to a gas-insulated switching apparatus including a tank filled with an insulating gas.

BACKGROUND

In a gas-insulated switching apparatus for use at a substation and a generating station, which are electric power stations, voltage is applied to main buses of three phases that are a U phase, a V phase, and a W phase. Divergence buses diverge from the main buses of the three phases, and circuit breakers and disconnect switches for interrupting current are connected to the divergence buses. The main buses, the divergence buses, the circuit breakers, and the disconnect switches are housed inside a tank filled with an insulating gas, so that insulation of a main circuit is maintained.

The circuit scheme of gas-insulated switching apparatuses includes a circuit scheme of what is called a double bus scheme in which one divergence bus is drawn from two main buses. Additionally, there are gas-insulated switching apparatuses of a three-phase-integrated type in which conductors of the three phases are housed together inside a tank, and gas-insulated switching apparatuses of a three-phase-isolated type in which conductors of the three phases are housed in separate tanks, as disclosed in Patent Literature 1.

CITATION LIST

Patent Literature

Patent Literature 1: International Publication WO 2008/068944

SUMMARY

Technical Problem

In some gas-insulated switching apparatuses of the three-phase-isolated type, three groups of buses, which are for the three phases, are arranged in a height direction, a connection bus is disposed across the buses of the same phase, and a divergence bus diverges downward from the connection bus. In this case, disposing grounding switches above the connection buses presents a problem of increase in the height of such a gas-insulated switching apparatus.

The present invention has been achieved in view of the above, and an object of the present invention is to provide a gas-insulated switching apparatus that can reduce its height.

Solution to Problem

To solve the above problem and achieve the object, the present invention provides a gas-insulated switching apparatus of a three-phase-isolated type, the apparatus comprising: two first main buses extending in parallel at an identical height; a first connection bus interconnecting the first main buses; a first divergence bus diverging downward from the first connection bus; a first circuit breaker connected to the first divergence bus; two second main buses extending at an identical height below the first main buses in parallel with the first main buses; a second connection bus interconnecting the second main buses; a second divergence bus diverging downward from the second connection bus; a second circuit breaker connected to the second divergence bus; two third main buses extending at an identical height below the second main buses in parallel with the first main buses; a third connection bus interconnecting the third main buses; a third divergence bus diverging downward from the third connection bus; and a third circuit breaker connected to the third divergence bus, wherein a connection portion between the first connection bus and the first divergence bus is disposed at a position lower than the height at which the first main buses extend, and a grounding switch is disposed above the connection portion between the first connection bus and the first divergence bus.

Advantageous Effects of Invention

A gas-insulated switching apparatus according to the present invention achieves an effect of being capable of reducing its height.

BRIEF DESCRIPTION OF DRAWINGS

FIG. 14 is a sectional view of a gas-insulated switching apparatus according to a first modification of the second embodiment and corresponds to the sectional view taken along line C-C illustrated in FIG. 8.

DESCRIPTION OF EMBODIMENTS

Exemplary embodiments of a gas-insulated switching apparatus according to the present invention will now be described in detail with reference to the drawings. The present invention is not limited to the embodiments.

First Embodiment.

Figure 1:
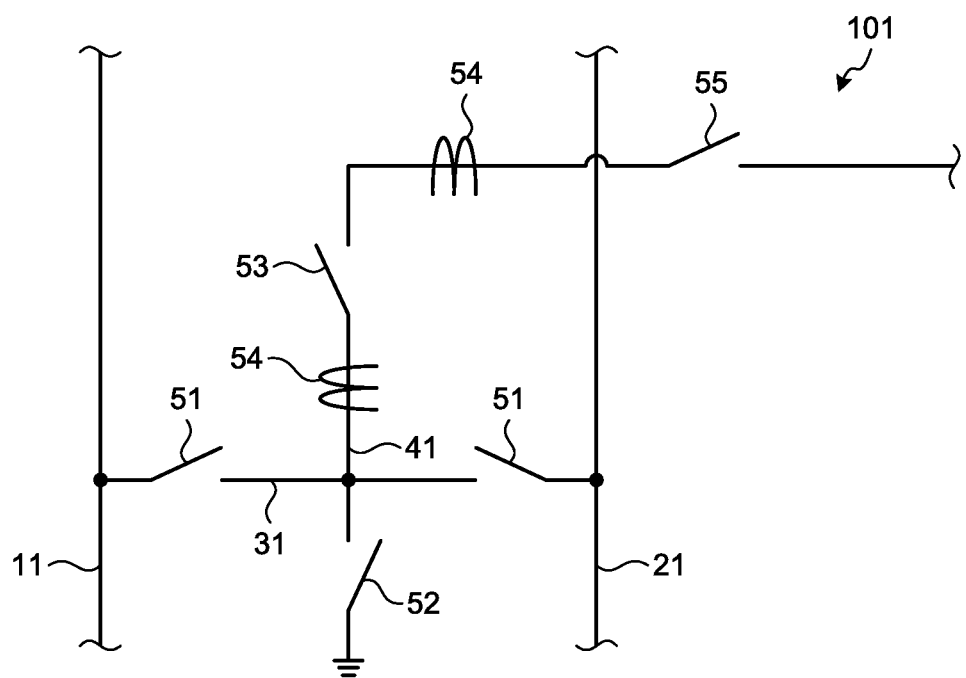
FIG. 1 is a diagram schematically illustrating a gas-insulated switching apparatus according to a first embodiment of the present invention in a skeleton diagram.

FIG. 1 is a diagram schematically illustrating a gas-insulated switching apparatus 101 according to a first embodiment of the present invention in a skeleton diagram. In the gas-insulated switching apparatus 101, main buses 11 and 21 are connected through a connection bus 31, and a divergence bus 41 diverges from the connection bus 31 toward an undepicted power transmission and reception target. A disconnect switch 51 is disposed at a point on the connection bus 31 between the main bus 11 and the divergence bus 41, and another disconnect switch 51 is disposed at a point on the connection bus 31 between the main bus 21 and the divergence bus 41. The gas-insulated switching apparatus 101 is a gas-insulated switching apparatus 101 of what is called a double bus type, in which the two main buses 11 and 21 are connected to the divergence bus 41.

A grounding switch 52, a circuit breaker 53, an instrument current transformer 54, and a grounding-switch-equipped disconnect switch 55 are connected to the divergence bus 41. In case of an accident, the gas-insulated switching apparatus 101 prevents damage from spreading by opening contact points of the circuit breaker 53. During maintenance of the circuit breaker 53, contact points of the disconnect switches 51 and the grounding-switch-equipped disconnect switch 55 are opened.

Figure 2:
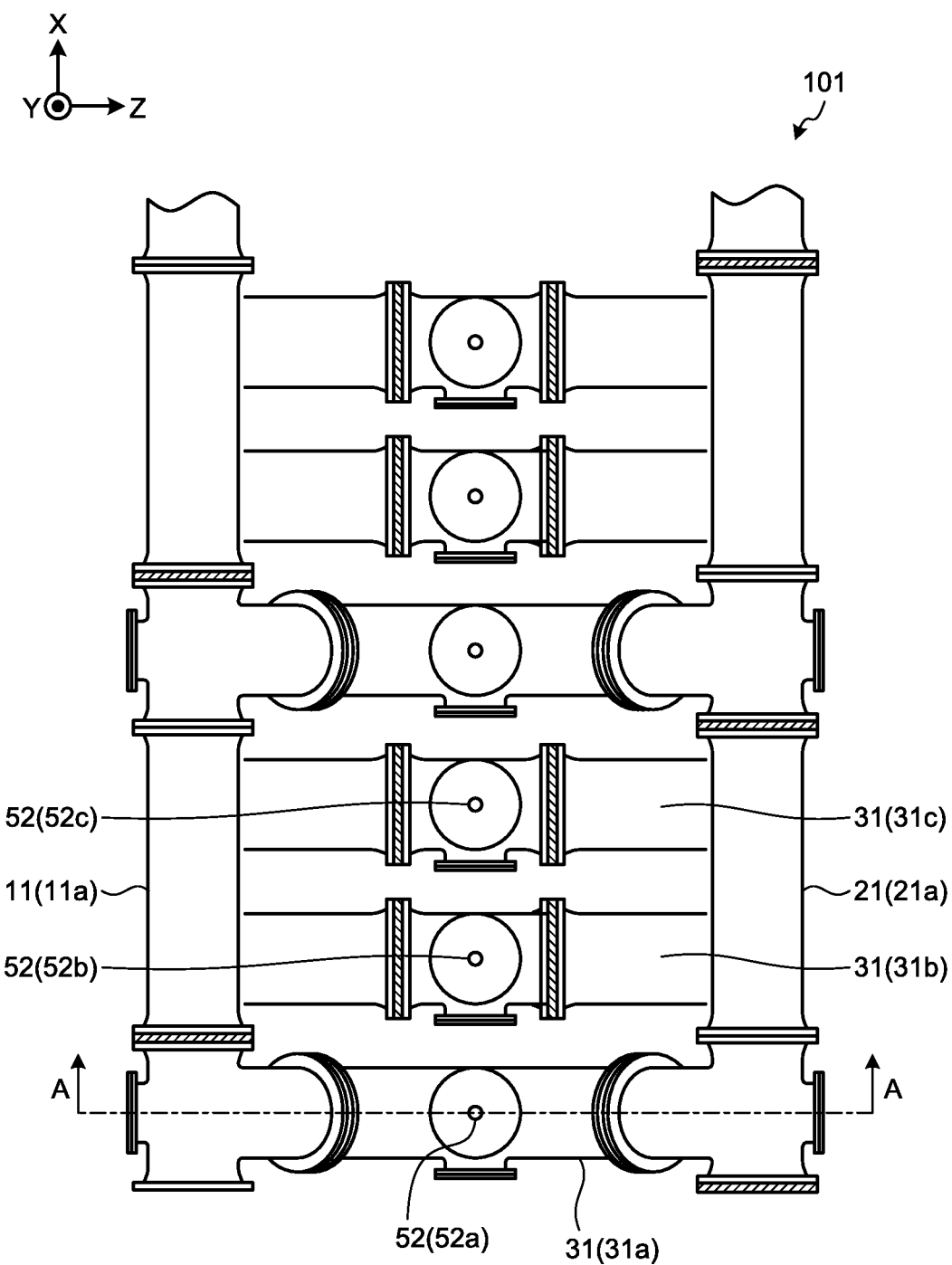
FIG. 2 is a plan view illustrating the gas-insulated switching apparatus according to the first embodiment as installed.
Figure 3:
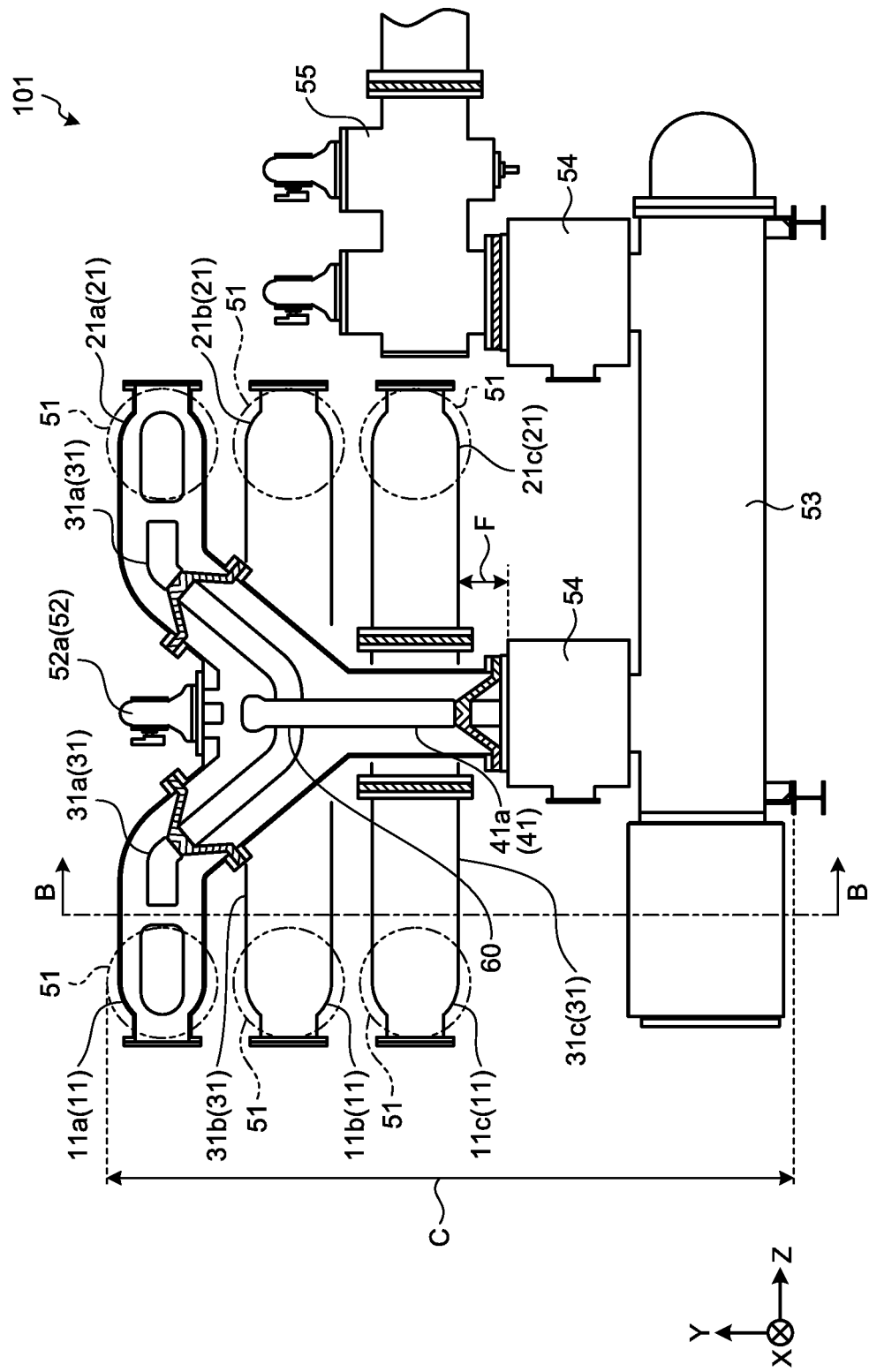
FIG. 3 is a sectional view of the gas-insulated switching apparatus according to the first embodiment taken along line A-A illustrated in FIG. 2.
Figure 4:
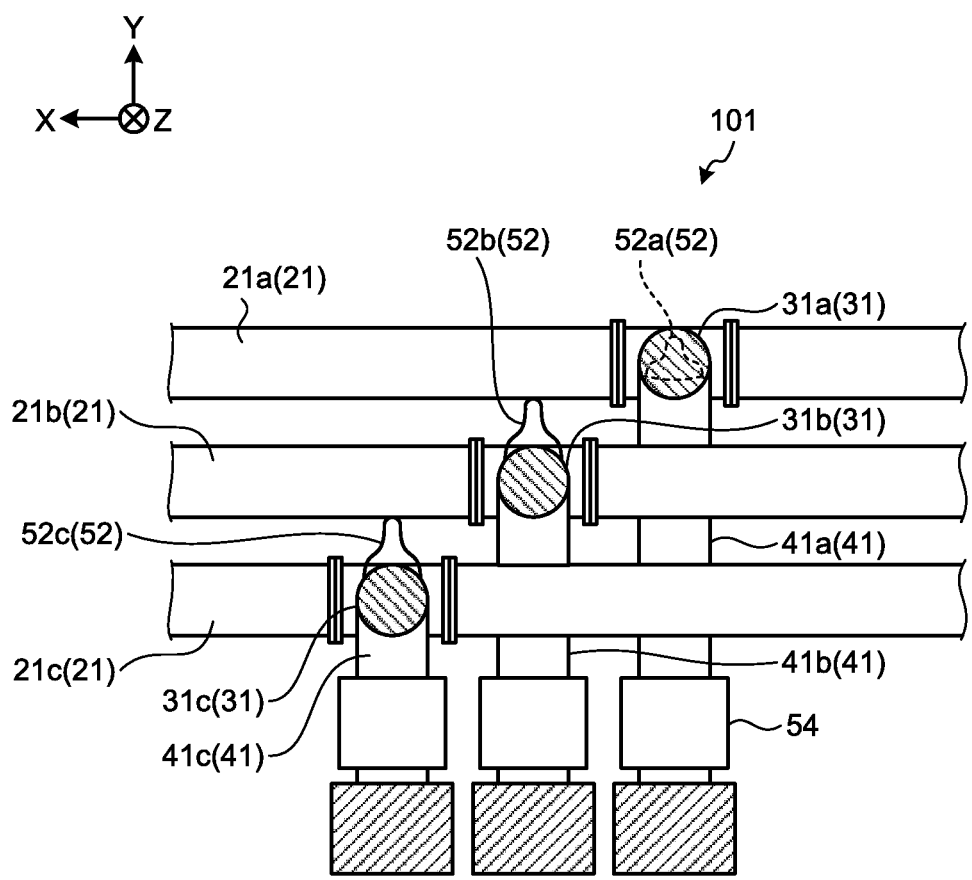
FIG. 4 is a sectional view of the gas-insulated switching apparatus according to the first embodiment taken along line B-B illustrated in FIG. 3.

The configuration of the gas-insulated switching apparatus 101 will now be described more specifically. FIG. 2 is a plan view illustrating the gas-insulated switching apparatus 101 as installed. FIG. 3 is a sectional view of the gas-insulated switching apparatus 101 according to the first embodiment taken along line A-A illustrated in FIG. 2. FIG. 4 is a sectional view of the gas-insulated switching apparatus 101 according to the first embodiment taken along line B-B illustrated in FIG. 3. In the gas-insulated switching apparatus 101, three groups of the main buses 11 and 21 illustrated in the skeleton diagram in FIG. 1 are installed in combination. The three groups of the main buses are referred to as first main buses 11a and 21a, second main buses 11b and 21b, and third main buses 11c and 21c in the description below. The connection bus 31 of a system that includes the first main buses 11a and 21a is referred to as a first connection bus 31a, the divergence bus 41 of the system as a first divergence bus 41a, and the grounding switch 52 of the system as a first grounding switch 52a. The connection bus 31 of a system that includes the second main buses 11b and 21b is referred to as a second connection bus 31b, the divergence bus 41 of the system as a second divergence bus 41b, and the grounding switch 52 of the system as a second grounding switch 52b. The connection bus 31 of a system that includes the third main buses 11c and 21c is referred to as a third connection bus 31c, the divergence bus 41 of the system as a third divergence bus 41c, and the grounding switch 52 of the system as a third grounding switch 52c. Different names for each of the systems of the main buses 11 and 21 are not used for the disconnect switches 51, the circuit breaker 53, the instrument current transformer 54, and the grounding-switch-equipped disconnect switch 55. That is, the same name will be used for the description of the circuit breakers 53, which are first to third circuit breakers.

In the gas-insulated switching apparatus 101, the first to third main buses 11a to 11c and 21a to 21c and the first to third divergence buses 41a to 41c diverging from the first to third main buses 11a to 11c and 21a to 21c, respectively, make up one circuit. The gas-insulated switching apparatus 101 is a gas-insulated switching apparatus 101 of what is called a three-phase-isolated type, and the system including the first main buses 11a and 21a, the system including the second main buses 11b and 21b, and the system including the third main buses 11c and 21c are housed in separate tanks. The tanks housing the respective systems are filled with an insulating gas. The insulating gas is, for example, $SF_6$ gas.

The main buses 11 and 21 are disposed so as to extend in parallel along a horizontal direction indicated by an arrow X. The first main buses 11a and 21a are disposed at an identical height. As is the case with the first main buses 11a and 21a, the second main buses 11b and 21b are disposed so as to extend along the horizontal direction indicated by the arrow X. The second main bus 11b is disposed below the first main bus 11a. The second main bus 21b is disposed below the first main bus 21a. The second main buses 11b and 21b are disposed at an identical height.

As is the case with the first main buses 11a and 21a, the third main buses 11c and 21c are disposed so as to extend along the horizontal direction indicated by the arrow X. The third main bus 11c is disposed below the second main bus 11b. The third main bus 21c is disposed below the second main bus 21b. The third main buses 11c and 21c are disposed at an identical height. The first main bus 11a, the second main bus 11b, and the third main bus 11c are disposed in alignment along a vertical direction indicated by an arrow Y. This can be rephrased that the second main bus 11b is disposed between the first main bus 11a and the third main bus 11c. The first main bus 21a, the second main bus 21b, and the third main bus 21c are disposed in alignment along the vertical direction indicated by the arrow Y. As illustrated in FIG. 2 and FIG. 4, the first connection bus 31a, the second connection bus 31b, and the third connection bus 31c are disposed so as to be offset from one another in the direction indicated by the arrow X.

A connection portion 60 between the first connection bus 31a and the first divergence bus 41a is located lower than heights at which the first main buses 11a and 21a are disposed. More specifically, the first connection bus 31a extends from the first main bus 11a toward the connection portion 60 in a downward inclining position. Similarly, the first connection bus 31a extends from the first main bus 21a toward the connection portion 60 in a downward inclining position. In this way, the first connection bus 31a has a shape depressed downward at the connection portion 60. Although the inclination angles of the first connection bus 31a are 45 degrees with respect to the horizontal direction in the example illustrated in FIG. 3, the inclination angles are not limited to this angle. The first grounding switch 52a is disposed above the connection portion 60.

The circuit breaker 53, which extends in a direction indicated by an arrow Z away from the first divergence bus 41a to a side of the first main bus 21a, is connected to a lower part of the first divergence bus 41a. An instrument current transformer 54 and the grounding-switch-equipped disconnect switch 55 are connected to the circuit breaker 53 at positions that avoid the first to third main buses 21a to 21c.

A connection portion between the second connection bus 31b and the second divergence bus 41b is at a height identical with those of the second main buses 11b and 21b. That is, the second connection bus 31b interconnects the second main buses 11b and 21b linearly. The second grounding switch 52b is disposed above the connection portion between the second connection bus 31b and the second divergence bus 41b.

A connection portion between the third connection bus 31c and the third divergence bus 41c is at a height identical with those of the third main buses 11c and 21c. That is, the third connection bus 31c interconnects the third main buses 11c and 21c linearly. The third grounding switch 52c is disposed above the connection portion between the third connection bus 31c and the third divergence bus 41c.

The circuit breaker 53, the instrument current transformers 54, and the grounding-switch-equipped disconnect switch 55 are connected to the second divergence bus 41b and the third divergence bus 41c in a similar manner to those connected to the first divergence bus 41a, and thus their detailed description is omitted.

Figure 5:
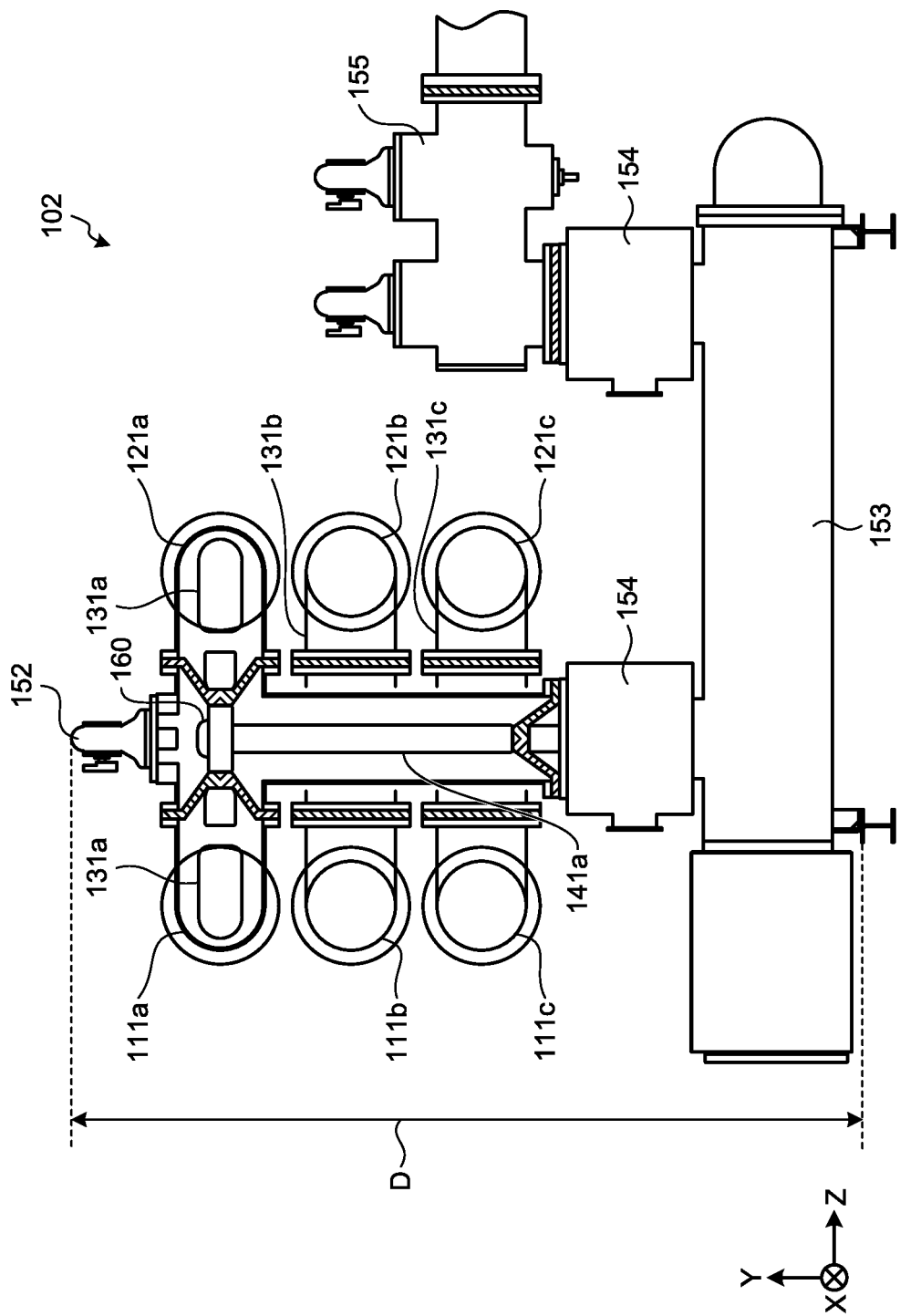
FIG. 5 is a sectional view of a gas-insulated switching apparatus according to a comparative example and corresponds to the sectional view taken along line A-A illustrated in FIG. 2.

The configuration of a gas-insulated switching apparatus according to a comparative example will now be described. FIG. 5 is a sectional view of a gas-insulated switching apparatus 102 according to the comparative example and corresponds to the sectional view taken along line A-A illustrated in FIG. 2. As is the case with the gas-insulated switching apparatus 101 according to the first embodiment, the gas-insulated switching apparatus 102 according to the comparative example includes first main buses 111a and 121a, second main buses 111b and 121b, third main buses 111c and 121c, first to third connection buses 131a to c, a first divergence bus 141a, a grounding switch 152, a circuit breaker 153, an instrument current transformer 154, and a grounding-switch-equipped disconnect switch 155.

As illustrated in FIG. 5, in the gas-insulated switching apparatus 102, a connection portion 160 between the first connection bus 131a and the first divergence bus 141a is at a height identical with those of the first main buses 111a and 121a. Hence, the first connection bus 131a interconnects the first main buses 111a and 121a linearly in a manner similar to the second connection bus 131b that interconnects the second main buses 111b and 121b, and the third connection bus 131c that interconnects the third main buses 111c and 121c.

Here, in the gas-insulated switching apparatus 102 according to the comparative example, the grounding switch 152, which is disposed above the connection portion 160, protrudes upward so as to be higher than the first main buses 111a and 121a. In contrast, as illustrated in FIG. 3, since the connection portion 60 is located below the first main buses 11a and 21a in the gas-insulated switching apparatus 101 according to the first embodiment, the protrusion amount by which the first grounding switch 52a disposed above the connection portion 60 protrudes upward so as to be higher than the first main buses 11a and 21a can be reduced. In the first embodiment, the first grounding switch 52a does not protrude upward so as to be higher than the first main buses 11a and 21a.

Thus, a height C of the gas-insulated switching apparatus 101 according to the first embodiment can be reduced so as to be smaller than a height D of the gas-insulated switching apparatus 102 according to the comparative example. The gas-insulated switching apparatus 101 has its height subject to a height restriction in order that the apparatus is loaded on a transportation vehicle when the apparatus is transported to an installation site. If the height of the gas-insulated switching apparatus 101 is larger than the restricted height, the gas-insulated switching apparatus 101 has to be disassembled to be loaded on the transport vehicle, which causes excessive cost for the disassembling and assembling of the apparatus. In the gas-insulated switching apparatus 101 according to the first embodiment, the height of the apparatus can be reduced, so that reducing the height of the apparatus below the restricted height for transportation is easily achieved, and thereby the cost can be reduced.

Additionally, since the first main bus 11a, the second main bus 11b, and the third main bus 11c are disposed in alignment, the three disconnect switches 51 disposed at or in the vicinity of connection portions between the main buses 11 and the connection buses 31 can be operated together using a single operation shaft. Additionally, since the first main bus 21a, the second main bus 21b, and the third main bus 21c are disposed in alignment, the three disconnect switches 51 disposed at or in the vicinity of connection portions between the main buses 21 and the connection buses 31 can be operated together using a single operation shaft.

Figure 6:
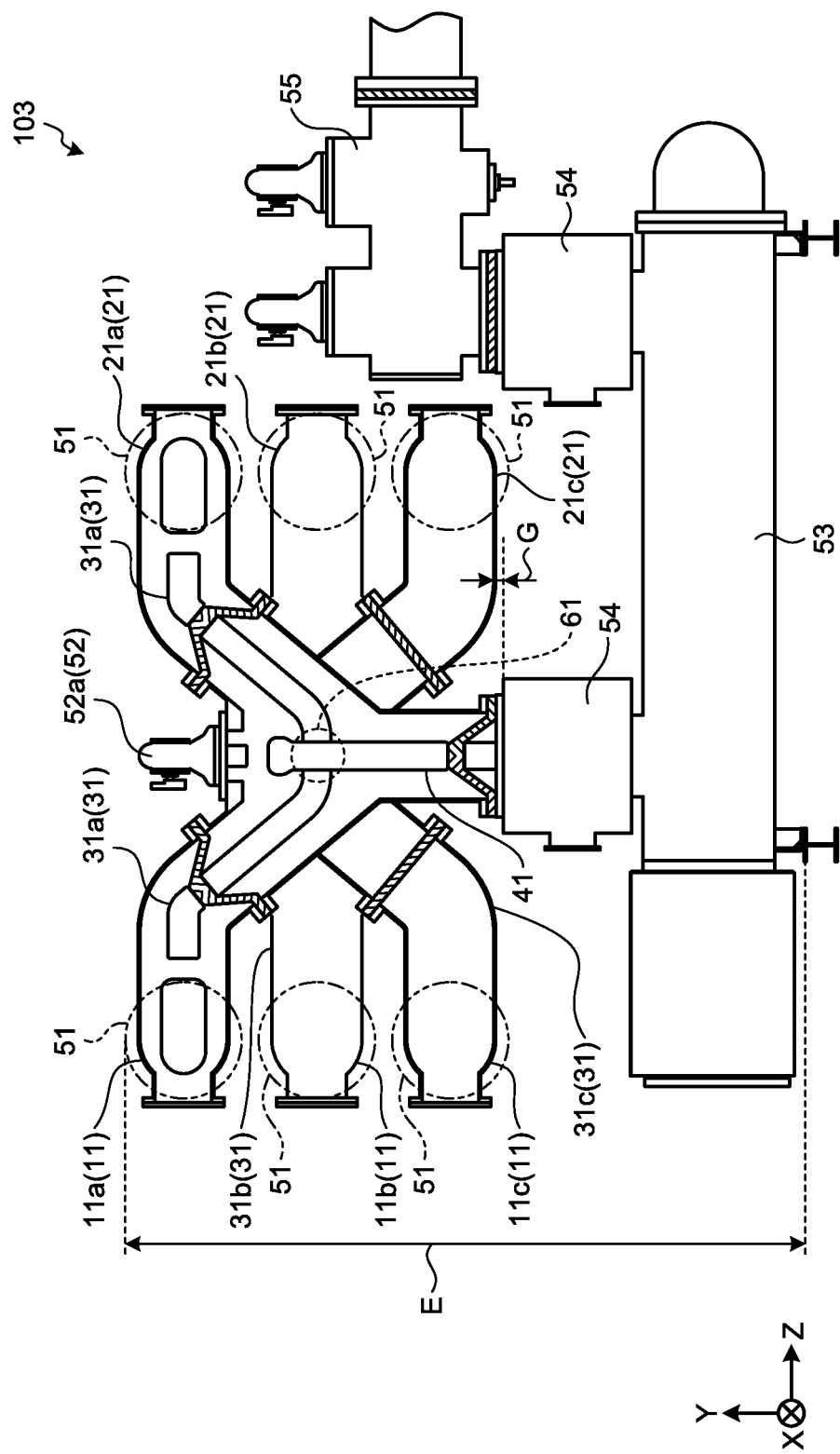
FIG. 6 is a sectional view of a gas-insulated switching apparatus according to a first modification of the first embodiment and corresponds to the sectional view taken along line A-A illustrated in FIG. 2.

FIG. 6 is a sectional view of a gas-insulated switching apparatus 103 according to a first modification of the first embodiment and corresponds to the sectional view taken along line A-A illustrated in FIG. 2. In the gas-insulated switching apparatus 103 according to the first modification of the first embodiment, a connection portion 61 between a third connection bus 31c disposed at the lowermost position, and the divergence bus 41 is located at a height larger than heights at which the third main buses 11c and 21c are disposed. More specifically, the third connection bus 31c extends from the third main bus 11c to the connection portion 61 in an upward inclining position. Similarly, the third connection bus 31c extends from the third main bus 21c to the connection portion 61 in an upward inclining position. In this manner, the third connection bus 31c has a shape depressed upward at the connection portion 61. Although the inclination angles of the third connection bus 31c are 45 degrees with respect to the horizontal direction in the example illustrated in FIG. 6, the inclination angles are not limited to this angle.

In the gas-insulated switching apparatus 103 according to the first modification of the first embodiment, the connection portion 61 is above the third main buses 11c and 21c, and hence, although a distance G from a component disposed below the divergence bus 41 to the third connection bus 31c in a height direction is shorter than a distance F illustrated in FIG. 3, it is easy to provide a distance for disposing the divergence bus 41 between the connection portion 61 and the component. Hence, the entirety of the main buses 11 and 21 can be lower than that of the gas-insulated switching apparatus 101 illustrated in FIG. 3; thus, a height E of the gas-insulated switching apparatus 103 according to the first modification of the first embodiment can be more reduced.

Figure 7:
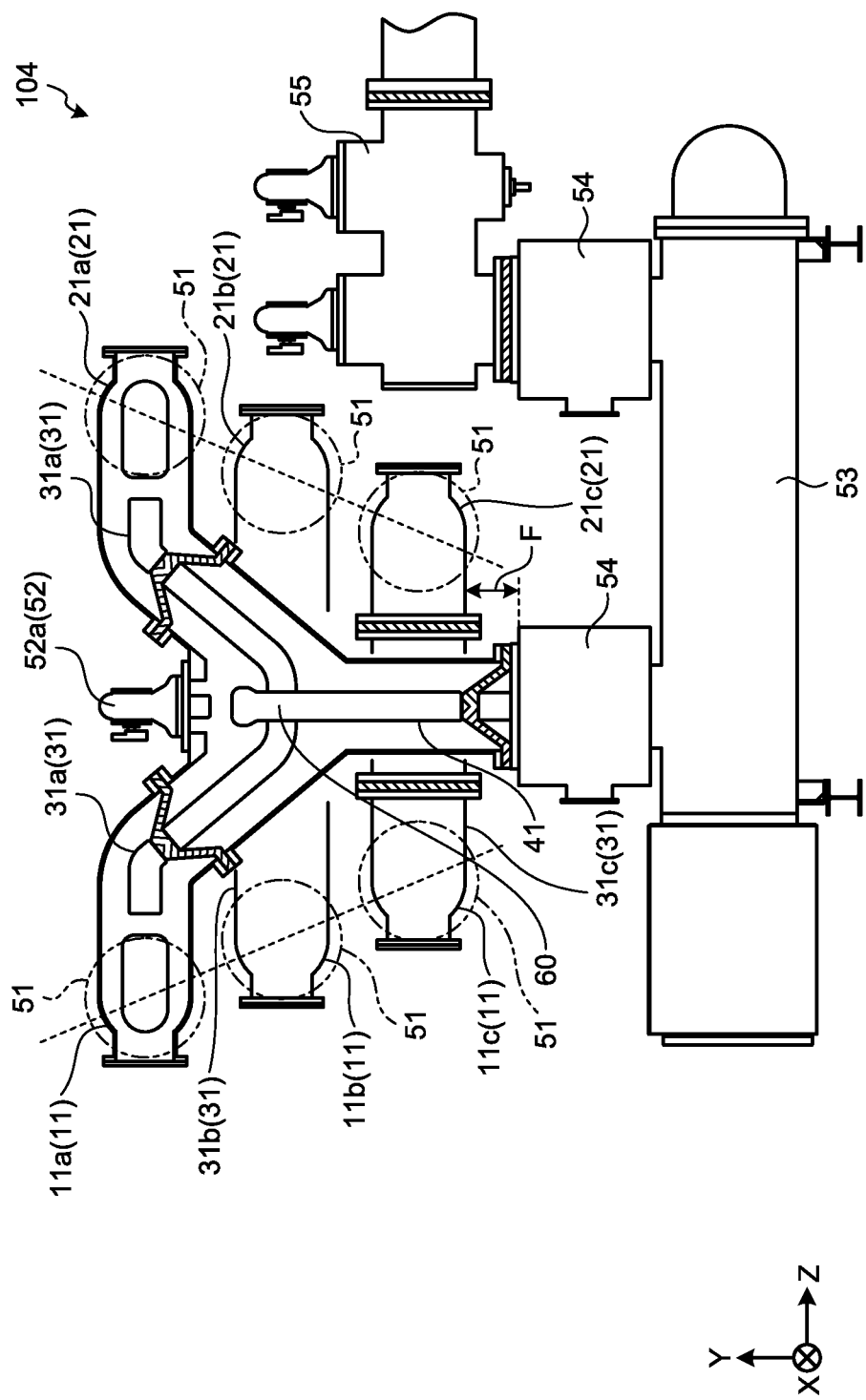
FIG. 7 is a sectional view of a gas-insulated switching apparatus according to a second modification of the first embodiment and corresponds to the sectional view taken along line A-A illustrated in FIG. 2.

FIG. 7 is a sectional view of a gas-insulated switching apparatus 104 according to a second modification of the first embodiment and corresponds to the sectional view taken along line A-A illustrated in FIG. 2. In the gas-insulated switching apparatus 104 according to the second modification of the first embodiment, main buses 11 and 21 are disposed so that lower ones of the main buses 11 and 21 have a shorter distance therebetween. Specifically, the distance between the second main buses 11b and 21b is shorter than that between the first main buses 11a and 21a, and the distance between the third main buses 11c and 21c is shorter than that between the second main buses 11b and 21b.

Additionally, the first main bus 11a, the second main bus 11b, and the third main bus 11c are disposed in alignment. This can be rephrased that the second main bus 11b is disposed between the first main bus 11a and the third main bus 11c. Additionally, the first main bus 21a, the second main bus 21b, and the third main bus 21c are disposed in alignment. This can be rephrased that the second main bus 21b is disposed between the first main bus 21a and the third main bus 21c.

In the gas-insulated switching apparatus 104 described in the second modification of the first embodiment, the lower ones of the main buses 11 and 21 can be brought closer to a side on which the divergence bus 41 is located. This allows an instrument current transformer 54 and a grounding-switch-equipped disconnect switch 55 to be brought closer to the divergence bus 41 than those of the gas-insulated switching apparatus 101 illustrated in FIG. 3. Thus, the gas-insulated switching apparatus 104 according to the second modification of the first embodiment enables reduction in the width along the direction indicated by the arrow Z, which is perpendicular and horizontal relative to the direction of extension of the main buses 11 and 21.

Although the lower main buses 11 and 21 on both sides on which the main buses 11 and the main buses 21 are disposed are brought closer to the divergence bus 41 in the example illustrated in FIG. 7, the width of the gas-insulated switching apparatus 104 along the direction indicated by the arrow Z can be reduced if the main bus on a side on which the instrument current transformer 54 and the grounding-switch-equipped disconnect switch 55 are disposed, that is, the lower main bus 21 is brought closer to the divergence bus 41.

Additionally, since the first main bus 11a, the second main bus 11b, and the third main bus 11c are disposed in alignment, three disconnect switches 51 disposed at or in the vicinity of connection portions between the main buses 11 and connection buses 31 can be operated together using a single operation shaft. Additionally, since the first main bus 21a, the second main bus 21b, and the third main bus 21c are disposed in alignment, three disconnect switches 51 disposed at or in the vicinity of connection portions between the main buses 21 and the connection buses 31 can be operated together using a single operation shaft.

As is the case with the example illustrated in the first modification of the first embodiment, a connection portion between the third connection bus 31c disposed at the lowermost position, and the divergence bus 41 may be above the position at which the third main buses 11c and 21c are disposed. Since there is no need to provide a space for disposing a grounding switch below the connection portion between the third connection bus 31c and the divergence bus 41, the distance between the third main buses 11c and 21c can be reduced so as to be shorter than that between the first main buses 11a and 21a. Such a configuration enables further reduction in size of the gas-insulated switching apparatus in the height direction and in the width direction.

Second Embodiment.

Figure 8:
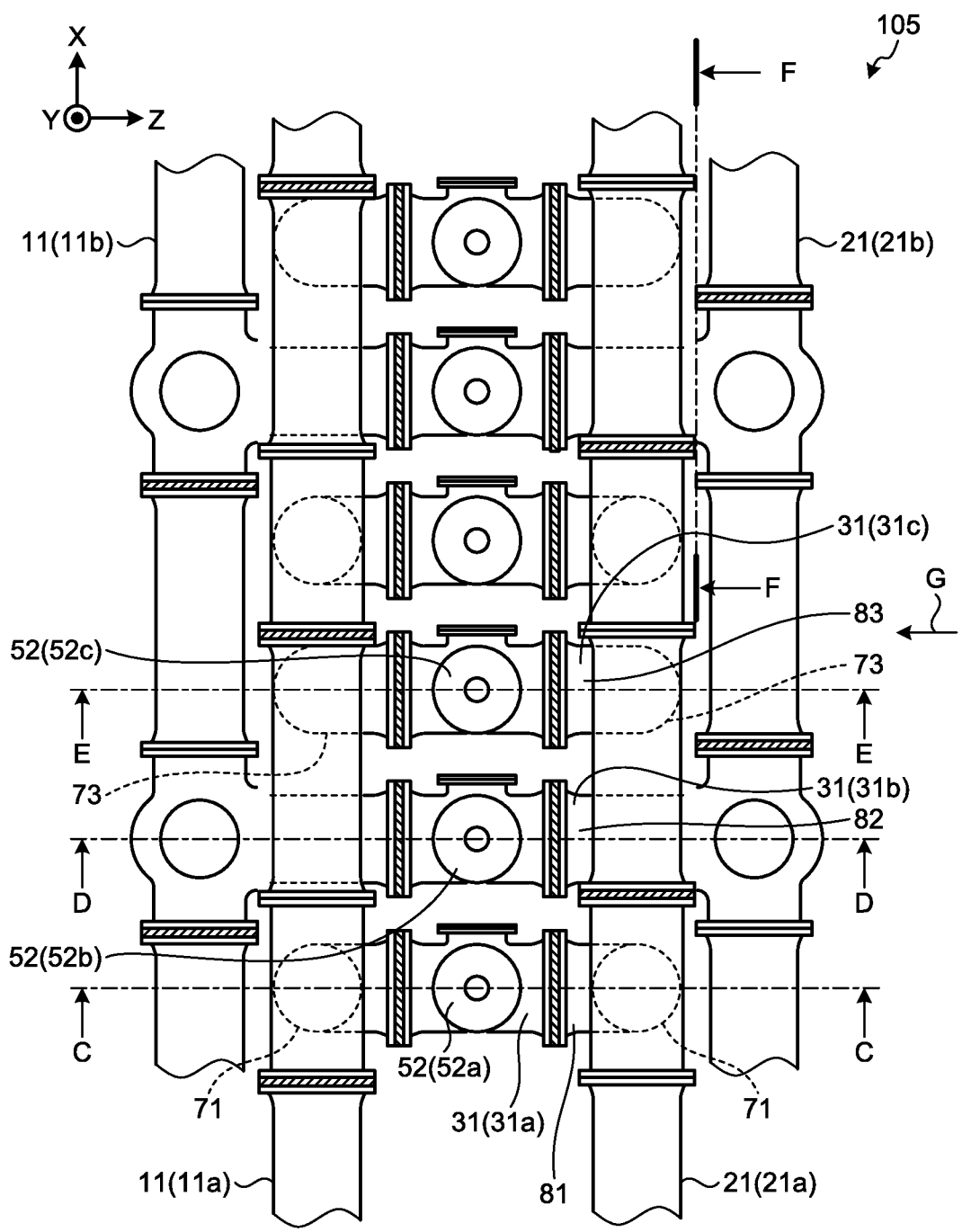
FIG. 8 is a plan view of a gas-insulated switching apparatus according to a second embodiment of the present invention as installed.
Figure 9:
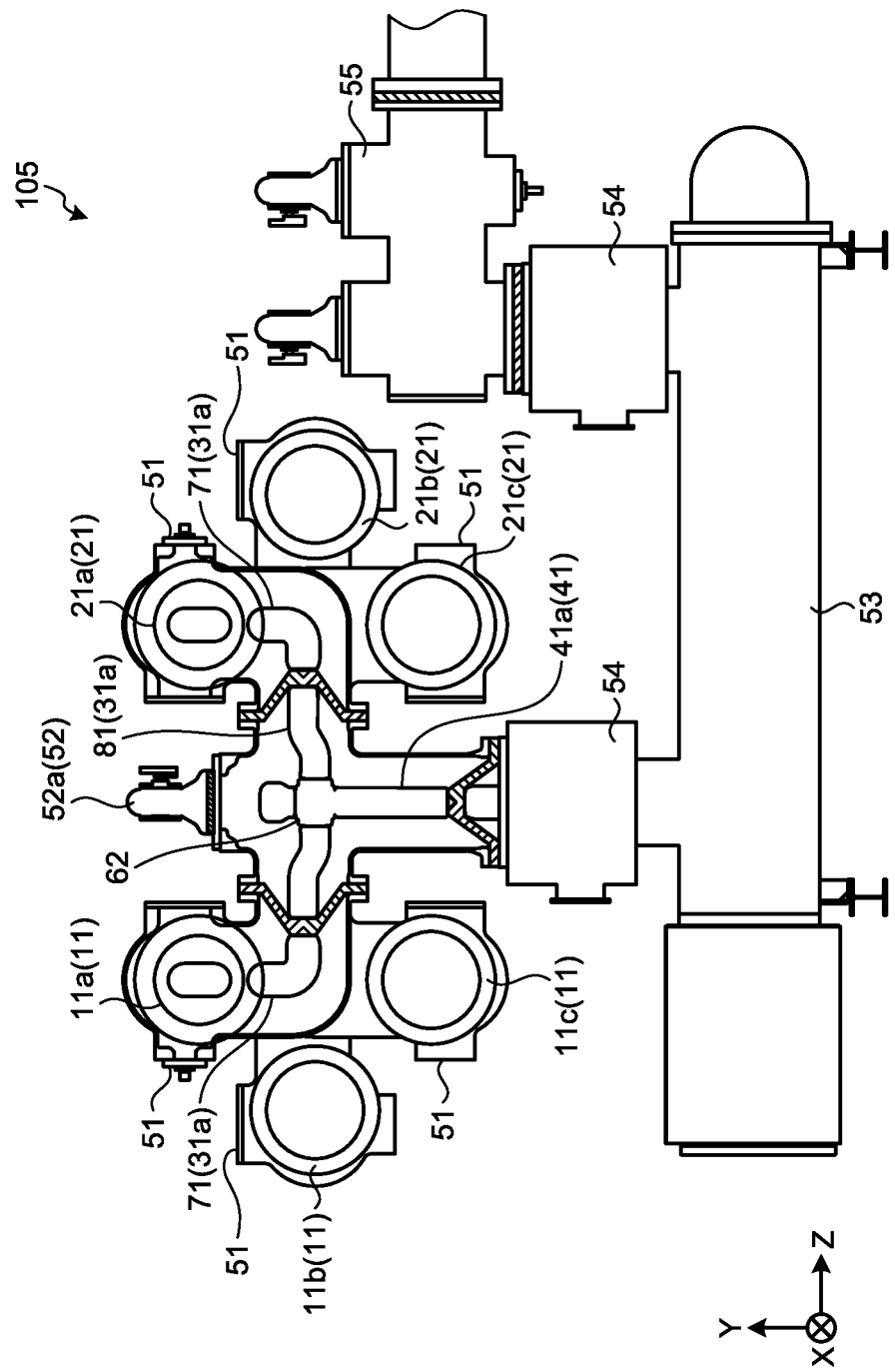
FIG. 9 is a sectional view of the gas-insulated switching apparatus according to the second embodiment taken along line C-C illustrated in FIG. 8.
Figure 10:
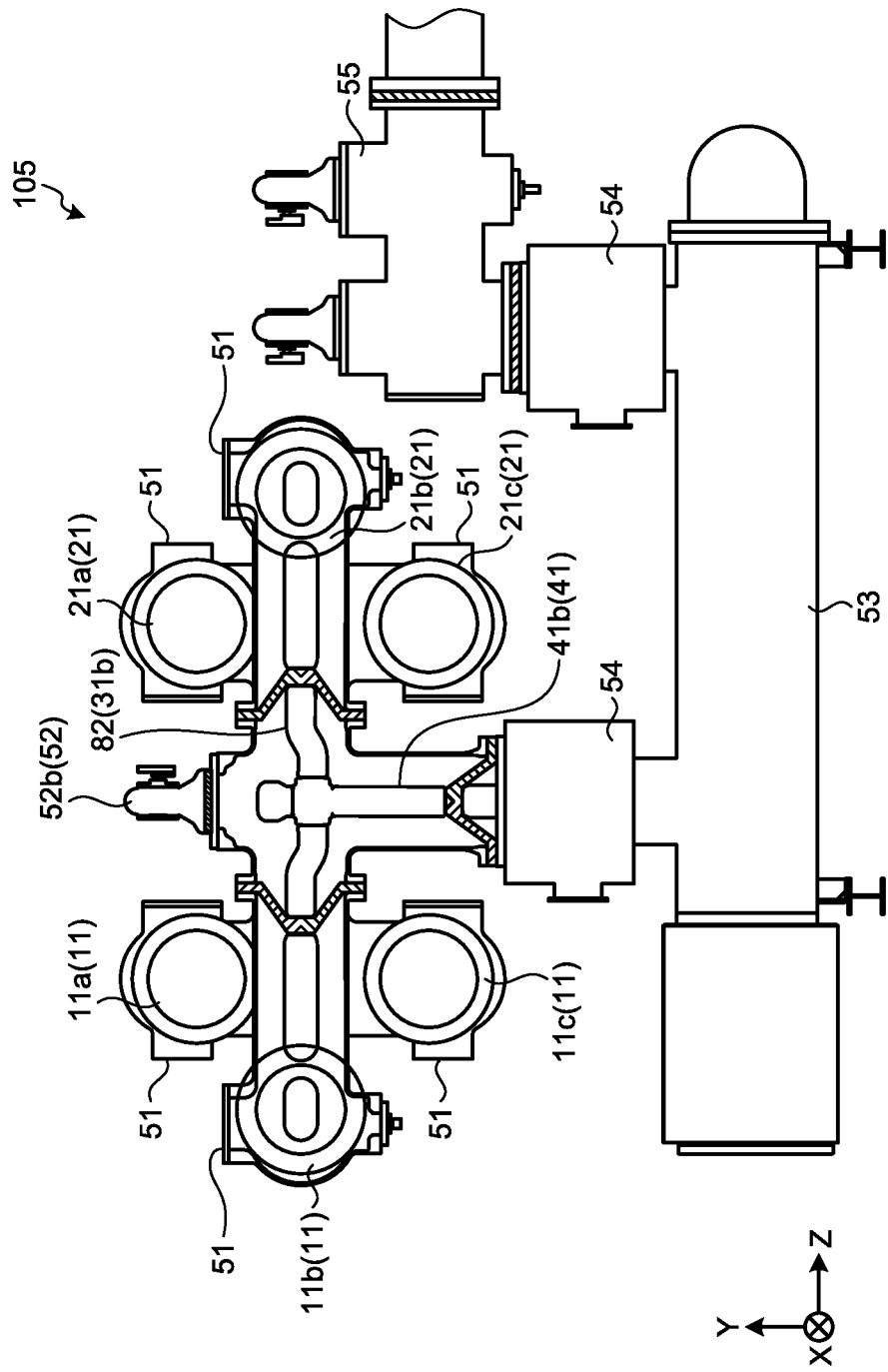
FIG. 10 is a sectional view of the gas-insulated switching apparatus according to the second embodiment taken along line D-D illustrated in FIG. 8.
Figure 11:
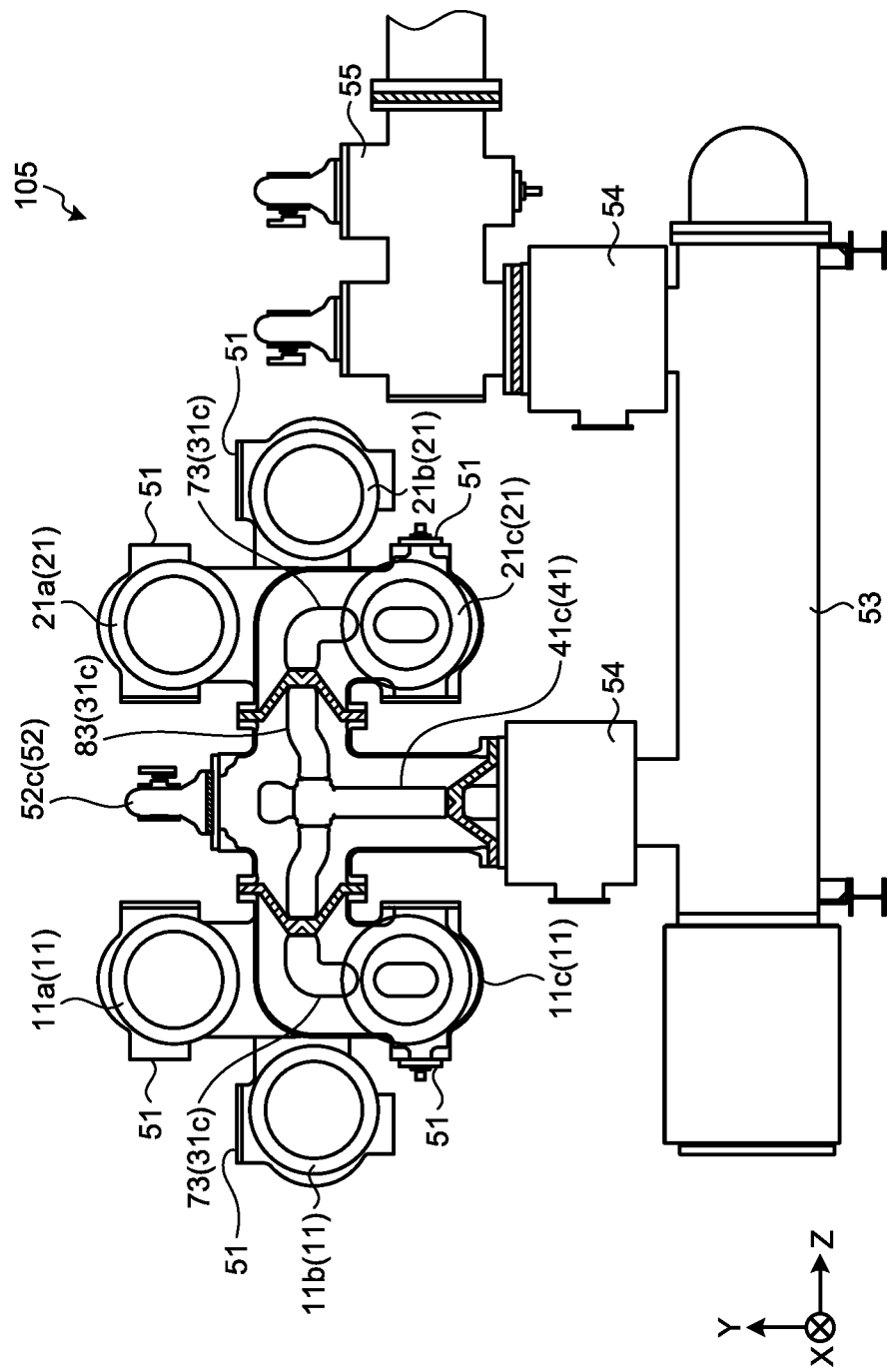
FIG. 11 is a sectional view of the gas-insulated switching apparatus according to the second embodiment taken along line E-E illustrated in FIG. 8.
Figure 12:
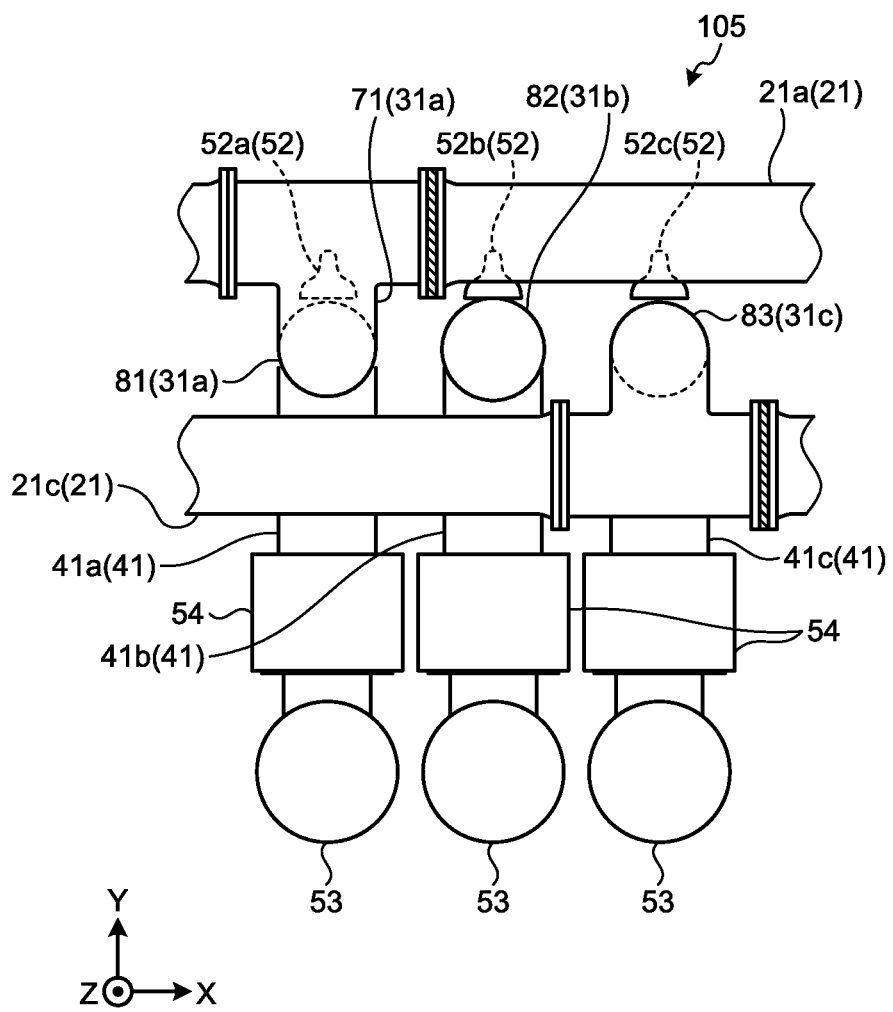
FIG. 12 is a sectional view of the gas-insulated switching apparatus according to the second embodiment taken along line F-F illustrated in FIG. 8.
Figure 13:
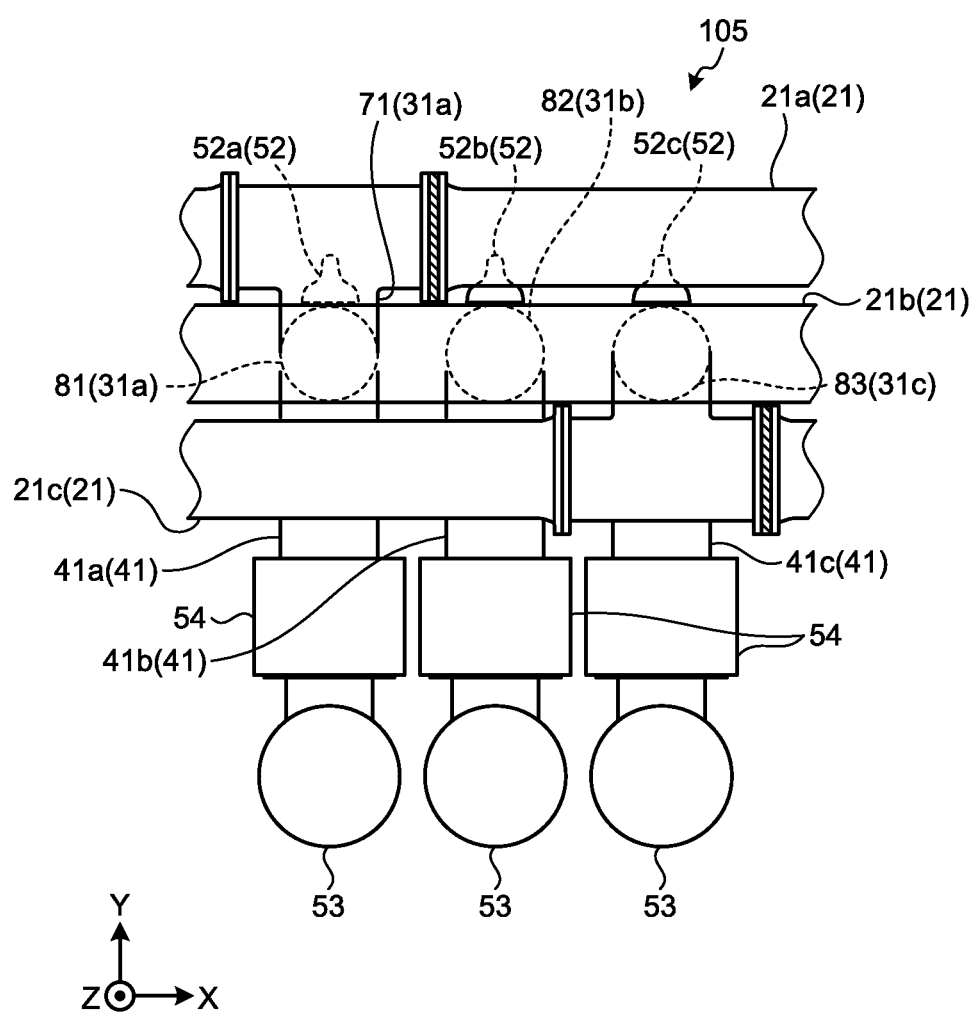
FIG. 13 is a diagram of the gas-insulated switching apparatus according to the second embodiment viewed along an arrow G illustrated in FIG. 8.

FIG. 8 is a plan view illustrating a gas-insulated switching apparatus 105 according to a second embodiment of the present invention as installed. FIG. 9 is a sectional view of the gas-insulated switching apparatus 105 according to the second embodiment taken along line C-C illustrated in FIG. 8. FIG. 10 is a sectional view of the gas-insulated switching apparatus 105 according to the second embodiment taken along line D-D illustrated in FIG. 8. FIG. 11 is a sectional view of the gas-insulated switching apparatus 105 according to the second embodiment taken along line E-E illustrated in FIG. 8. FIG. 12 is a sectional view of the gas-insulated switching apparatus 105 according to the second embodiment taken along line F-F illustrated in FIG. 8. FIG. 13 is a diagram of the gas-insulated switching apparatus 105 according to the second embodiment viewed along an arrow G illustrated in FIG. 8. Elements similar to those in the first embodiment described above are designated with like reference signs and their detailed description will be omitted.

In the gas-insulated switching apparatus 105 according to the second embodiment, a first connection bus 31a has first vertical portions 71 extending downward from first main buses 11a and 21a, and a first horizontal portion 81 extending horizontally from the first vertical portions 71 and interconnect the first vertical portions 71, as illustrated in FIG. 9. A first divergence bus 41a diverges downward from the first horizontal portion 81.

This configuration enables a connection portion 62 between the first connection bus 31a and the first divergence bus 41a to be located lower than the height at which the first main buses 11a and 21a are disposed, as is the case with the first embodiment described above. Hence, as is the case with the first embodiment, the protrusion amount by which a first grounding switch 52a disposed above the connection portion 62 protrudes upward so as to be higher than the first main buses 11a and 21a can be reduced, and the height of the gas-insulated switching apparatus 105 can be reduced.

As illustrated in FIG. 10, a second connection bus 31b has a second horizontal portion 82 extending horizontally from second main buses 11b and 21b and interconnecting the second main buses 11b and 21b. A second divergence bus 41b diverges downward from the second horizontal portion 82.

As illustrated in FIG. 11, a third connection bus 31c has third vertical portions 73 extending upward from third main buses 11c and 21c, and a third horizontal portion 83 extending horizontally from the third vertical portions 73 and interconnecting the third vertical portions 73. A third divergence bus 41c diverges downward from the third horizontal portion 83.

The distance between the second main buses 11b and 21b is greater than the length of the first horizontal portion 81 and the length of the third horizontal portion 83. This allows the first vertical portions 71 and the third vertical portions 73 to be disposed avoiding interference with the second main buses 11b and 21b. Additionally, reducing the distance between the first main buses 11a and 21a enables reduction in size of the gas-insulated switching apparatus 105. Additionally, reducing the distance between the third main buses 11c and 21c enables reduction in size of the gas-insulated switching apparatus 105.

FIG. 14 is a sectional view of a gas-insulated switching apparatus 106 according to a first modification of the second embodiment and corresponds to the sectional view taken along line E-E illustrated in FIG. 8. In the gas-insulated switching apparatus 106 according to the first modification of the second embodiment, third main buses 11c and 21c are interconnected by a third horizontal portion 83 extending horizontally from the third main buses 11c and 21c. This enables reduction in length of the third connection bus 31c, thereby reducing the gas-insulated switching apparatus 106 in weight and reducing manufacturing cost due to reduction of material to be used. A spacer 56, which partitions the inside of a tank housing the third connection bus 31c into a plurality of gas zones, is disposed so as to be depressed toward the third main buses 11c and 21c. Additionally, disposing an instrument current transformer 54 and a grounding-switch-equipped disconnect switch 55 side by side enables reduction in length of a circuit breaker 53. The instrument current transformer 54 and the grounding-switch-equipped disconnect switch 55 can be disposed side by side in the gas-insulated switching apparatus described in the first embodiment and the like.

The configurations in the embodiments described above represent some examples of the present invention, and they can be combined with another publicly known technique and partially omitted or modified without departing from the present invention.

REFERENCE SIGNS LIST 11, 21 main bus, 11a, 21a, 111a, 121a first main bus, 11b, 21b, 111b, 121b second main bus, 11c, 21c, 111c, 121c third main bus, 31 connection bus, 31a, 131a first connection bus, 31b, 131b second connection bus, 31c, 131c third connection bus, 41 divergence bus, 41a first divergence bus, 41b second divergence bus, 41c third divergence bus, 51 disconnect switch, 52 grounding switch, 52a first grounding switch, 52b second grounding switch, 52c third grounding switch, 53 circuit breaker, 54 instrument current transformer, 55 grounding-switch-equipped disconnect switch, 56 spacer, 60, 61, 62 connection portion, 71 first vertical portion, 81 first horizontal portion, 82 second horizontal portion, 73 third vertical portion, 83 third horizontal portion, 101, 102, 103, 104, 105, 106 gas-insulated switching apparatus.

The invention claimed is:

1. A gas-insulated switching apparatus of a three-phase-isolated type, the apparatus comprising:
    two first main buses extending in parallel at an identical height;
    a first connection bus interconnecting the first main buses;
    a first divergence bus diverging downward from the first connection bus;
    a first circuit breaker connected to the first divergence bus;
    two second main buses extending at an identical height below the first main buses in parallel with the first main buses;
    a second connection bus interconnecting the second main buses;
    a second divergence bus diverging downward from the second connection bus;
    a second circuit breaker connected to the second divergence bus;
    two third main buses extending at an identical height below the second main buses in parallel with the first main buses;
    a third connection bus interconnecting the third main buses;
    a third divergence bus diverging downward from the third connection bus; and
    a third circuit breaker connected to the third divergence bus,
    wherein a connection portion between the first connection bus and the first divergence bus is disposed at a position lower than the height at which the first main buses extend, and
    a grounding switch is disposed above the connection portion between the first connection bus and the first divergence bus.

2. The gas-insulated switching apparatus according to claim 1, wherein the first connection bus inclines downward toward the connection portion between the first connection bus and the first divergence bus.

3. The gas-insulated switching apparatus according to claim 2, wherein a connection portion between the third connection bus and the third divergence bus is disposed at a position higher than the height at which the third main buses extend.

4. The gas-insulated switching apparatus according to claim 2, wherein a distance between the second main buses and a distance between the third main buses are shorter than a distance between the first main buses.

5. The gas-insulated switching apparatus according to claim 4, wherein, when viewed along a direction of extension of the first main buses, the second main bus is disposed between the first main bus and the third main bus on at least one side of the first to third divergence buses.

6. The gas-insulated switching apparatus according to claim 1, wherein the first connection bus has first vertical portions extending downward from the first main buses and a first horizontal portion extending horizontally from the first vertical portions and interconnecting the first vertical portions,
    the second connection bus has a second horizontal portion extending horizontally from the second main buses and interconnecting the second main buses,
    the first divergence bus diverges from the first horizontal portion,
    the second divergence bus diverges from the second horizontal portion, and
    a distance between the second main buses is greater than a length of the first horizontal portion.

7. The gas-insulated switching apparatus according to claim 6, wherein the third connection bus has third vertical portions extending upward from the third main buses and a third horizontal portion extending horizontally from the third vertical portions and interconnecting the third vertical portions,
    the third divergence bus diverges from the third horizontal portion, and
    the distance between the second main buses is greater than a length of the third horizontal portion.

8. The gas-insulated switching apparatus according to claim 6, wherein the third connection bus has a third horizontal portion extending horizontally from the third main buses and interconnecting the third main buses, and
    the third divergence bus diverges from the third horizontal portion.

* * * * *